United States Patent
Kang et al.

(10) Patent No.: US 9,414,236 B2
(45) Date of Patent: Aug. 9, 2016

(54) COEXISTENCE MANAGER FOR CLASSIFYING AND ALLOCATING SHARED FREQUENCIES

(75) Inventors: Hyunduk Kang, Gwangju (KR); Dong-Hun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 614 days.

(21) Appl. No.: 13/293,667

(22) Filed: Nov. 10, 2011

(65) Prior Publication Data
US 2012/0115525 A1 May 10, 2012

(30) Foreign Application Priority Data

Nov. 10, 2010 (KR) .................. 10-2010-0111431
Nov. 9, 2011 (KR) .................. 10-2011-0116296

(51) Int. Cl.
*H04W 16/14* (2009.01)
*H04W 72/04* (2009.01)
*H04W 48/16* (2009.01)
*H04W 72/06* (2009.01)

(52) U.S. Cl.
CPC .............. *H04W 16/14* (2013.01); *H04W 48/16* (2013.01); *H04W 72/0453* (2013.01); *H04W 72/06* (2013.01)

(58) Field of Classification Search
CPC ... H04W 72/00; H04W 72/04; H04W 72/044; H04W 72/0453; H04W 72/12; H04W 72/121; H04W 72/1215; H04W 74/08; H04W 74/0808; H04W 74/0816; H04W 74/0833; H04W 48/16; H04W 28/00; H04W 16/14; H04W 16/16
See application file for complete search history.

(56) References Cited

U.S. PATENT DOCUMENTS

| 2007/0223508 | A1 | 9/2007 | Nandagopalan |
| 2008/0259859 | A1* | 10/2008 | Cordeiro et al. ............. 370/329 |
| 2011/0075586 | A1 | 3/2011 | Hu et al. |

(Continued)

FOREIGN PATENT DOCUMENTS

| KR | 1020060060452 A | 6/2006 |
| KR | 1020070048171 A | 5/2007 |

OTHER PUBLICATIONS

Hyunduk Kang, et al; "Procedures and protocols, and coexistence mechanisms and algorithms proposal", IEEE P802.19, Nov. 10, 2010, 30 Pages.

*Primary Examiner* — Philip Sobutka
(74) *Attorney, Agent, or Firm* — Ladas & Parry LLP

(57) ABSTRACT

Provided is a resource management system in a communication system including a plurality of systems having no right to use a first frequency band. The resource management system includes: a coexistence manager (CM) configured to manage the plurality of systems for the purpose of coexistence and frequency sharing of the plurality of systems in a frequency band available for the plurality of systems, when the available frequency band is detected in the first frequency band; a coexistence enabler (CE) configured to transmit and receive information of the plurality of systems and information of the CM; and a coexistence discovery and information server (CDIS) configured to support the CM to control the plurality of systems. The CM performs channel classification for the first frequency band based on channel information of the available frequency band, and allocates operating channels to the plurality of systems.

18 Claims, 2 Drawing Sheets

(56) References Cited

U.S. PATENT DOCUMENTS

| | | |
|---|---|---|
| 2011/0096770 A1 | 4/2011 | Henry |
| 2011/0116458 A1 | 5/2011 | Hsu et al. |
| 2011/0164581 A1 | 7/2011 | Keon |
| 2011/0243094 A1* | 10/2011 | Dayal et al. .................. 370/331 |
| 2011/0282915 A1* | 11/2011 | Steer et al. .................... 707/802 |
| 2012/0106364 A1* | 5/2012 | Kasslin et al. ................ 370/252 |

* cited by examiner

COEXISTENCE MANAGER FOR CLASSIFYING AND ALLOCATING SHARED FREQUENCIES

CROSS-REFERENCES TO RELATED APPLICATIONS

The present application claims priority of Korean Patent Application Nos. 10-2010-0111431 and 10-2011-0116296, filed on Nov. 10, 2010, and Nov. 9, 2011, respectively, which are incorporated herein by reference in their entirety.

BACKGROUND OF THE INVENTION

1. Field of the Invention

Exemplary embodiments of the present invention relate to a communication system; and, more particularly, to a resource management system and method for managing a plurality of frequency resources to be shared in a communication system.

2. Description of Related Art

In current communication systems, studies have been actively conducted to provide users with services which have various qualities of service (hereinafter referred to as 'QoS') at a high transmission rate. In the communication systems, studies have been actively conducted to provide a large capacity service having various QoS requirements using limited resources, e.g., frequency resources. In particular, with the development of radio communication technologies and the introduction of new radio communication services, it is necessary that the finite frequency resources should be more efficiently used.

Methods for maximizing spectrum efficiency through the optimization of a communication system, e.g., multi-access, coding, modulation, information compression, etc. and minimizing interference with other communication systems have been proposed as methods for improving the usage efficiency of the finite frequency resources in the communication system. There has been proposed a method for improving the usage efficiency of the frequency resources by utilizing an available frequency band in an already-used frequency band such as a TV band.

Here, the frequency sharing in an available frequency band in the already-used frequency band such as the TV band should be performed by utilizing the available frequency band without interfering with a primary incumbent having a priority to use the TV band. Therefore, it is important to check whether or not the primary incumbent uses the frequency band in the TV band and then detect an available frequency band. Furthermore, when there exist a plurality of different systems intended to use the available frequency band detected in the TV band, a problem occurs in coexistence for utilizing the available frequency band due to a difference in communication method, e.g., radio access method between the plurality of different systems.

In other words, in the current communication systems, when there exist a plurality of different systems intended to use the available frequency band detected in the TV band as described above, there is no specific resource management method in which the plurality of different systems efficiently use the detected available frequency band. In particular, a specific method for efficiently utilizing the frequency band when systems having different communication schemes coexist to use the available frequency band has not been proposed.

Therefore, it is required to propose a resource management method for detecting an available frequency band in an already-used frequency band such as a TV band in a communication system and then efficiently utilizing the detected available frequency band when a plurality of different systems, e.g., a plurality of systems having different communication schemes coexist.

SUMMARY OF THE INVENTION

An embodiment of the present invention is directed to a resource management system and method in a communication system.

Another embodiment of the present invention is directed to a resource management system and method which enables a plurality of systems to effectively use a frequency band available in an already-used frequency band in a communication system, through coexistence.

Another embodiment of the present invention is directed to a resource management system and method which manages frequency resources such that a plurality of systems coexist in a communication system and uses an available frequency band in a TV band.

Another embodiment of the present invention is directed to a resource management system and method which manages frequency resources such that an available frequency band of a TV band is allocated to a plurality of systems according to a channel allocation request of the plurality of systems coexisting in a communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, there is provided a resource management system in a communication system including a plurality of systems having no right to use a first frequency band. The resource management system includes: a coexistence manager (CM) configured to manage the plurality of systems for the purpose of coexistence and frequency sharing of the plurality of systems in a frequency band available for the plurality of systems, when the available frequency band is detected in the first frequency band; a coexistence enabler (CE) configured to transmit and receive information of the plurality of systems and information of the CM; and a coexistence discovery and information server (CDIS) configured to support the CM to control the plurality of systems. The CM performs channel classification for the first frequency band based on channel information of the available frequency band, and allocates operating channels to the plurality of systems.

In accordance with another embodiment of the present invention, there is provided a method for managing resources of a first frequency band in a communication system including a plurality of systems having no right to use the first frequency band. The method includes: acquiring channel information of a frequency band available for the plurality of systems from a TVWS BD providing channel information of the available frequency band, when the available frequency band is detected in the first frequency band; performing channel classification for the first frequency band based on the channel information of the available frequency band; and allocating operating channels of the plurality of systems from the channel classification for the first frequency band.

DESCRIPTION OF SPECIFIC EMBODIMENTS

Figure 1:
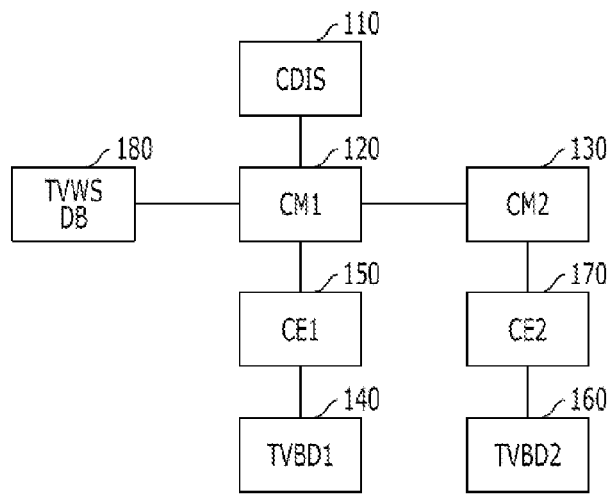
FIG. 1 schematically illustrates the architecture of a resource management system in a communication system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The exemplary embodiments of the present invention propose a resource management system and method for efficiently detecting and utilizing an available frequency band, e.g., a white space (hereinafter, referred to as 'WS') in an already-used frequency band such as a TV band in a communication system, e.g., a cognitive radio (hereinafter, referred to as 'CR') system, a system based on IEEE 802.19, or a system based on IEEE 802.22. In the embodiments of the present invention, the CR system, the system based on IEEE 802.19, and the system based on IEEE 802.22 is described as an example. However, the resource management system and method in accordance with the embodiments of the present invention may be applied to other communication systems.

In the embodiments of the present invention, there is proposed a resource management system and method for efficiently using frequency bands available in a TV band in a communication system where a plurality of different systems coexist. In the embodiments of the present invention, objects of the resource management system for sharing available frequency bands coexist in the communication system, and a plurality of systems, or particularly, systems having different communication methods, e.g., wireless access systems coexist in such a manner that the systems share an available frequency band in an already-used frequency band such as a TV band. Accordingly, utilization efficiency of frequency resources is improved.

In the embodiments of the present invention, the resource management system for coexistence and frequency sharing of the plurality of different systems in the communication system shares an available frequency band, thereby improving the usage efficiency of limited frequency resources. In the embodiments of the present invention, frequencies in the available frequency band are shared in an already-used frequency band such as a TV band. At this time, the available frequency band should be used without interfering with a primary incumbent having a priority for the TV band. Therefore, the resource management system checks whether or not the primary incumbent uses the frequency band in the TV band and detects an available frequency band, and the plurality of different systems intended to use the available frequency band detected from the TV band select and use operating channels in the detected available frequency band through coexistence and frequency sharing.

In other words, in the resource management system for coexistence and frequency sharing between the plurality of different systems in the communication system, predetermined objects for effective coexistence select operating channels in the WS. At this time, in order to effectively select operating channels in the WS, the resource management system classifies available channels in the WS and allocates the channels. Hereinafter, the resource management system in a communication system in accordance with the embodiment of the present invention will be described in more detail with reference to FIG. 1.

FIG. 1 schematically illustrates the architecture of the resource management system in the communication system in accordance with the embodiment of the present invention.

Referring to FIG. 1, when a plurality of different systems intend to use an available frequency band in an already-used frequency band such as a TV band, the resource management system includes sharing devices intended to use the available frequency band through frequency sharing in the plurality of different systems, e.g., TV band devices (hereinafter, referred to as 'TVBD'), e.g., a TVBD1 140 and a TVBD2 160, coexistence managers (hereinafter, referred to as 'CM'), e.g., a CM1 120 and a CM2 130, which manage the TVBDs 140 and 160 so as to improve the frequency sharing efficiency between the TVBDs 140 and 160, coexistence enablers (hereinafter, referred to as 'CE'), e.g., a CE1 140 and a CE2 170 which are included in the TVBDs 140 and 160 or independently positioned and serve as a path between the TVBDs 140 and 160 and the CMs 120 and 130, a server, e.g., a coexistence discovery and information server (hereinafter, referred to as a 'CIDS') 110, which supports the CEs 140 and 170 and the CMs 120 and 130 to control the TVBDs 140 and 160, and a TV white space database (hereinafter, referred to as a 'TVWS DB') 180 which provides channel information on an available band in the TV band, that is, a TVWS.

When a primary incumbent (hereinafter, referred to as 'primary system') having a priority to use the TV band does not use a predetermined frequency band in the TV band, the TVBDs 140 and 160 may indicate devices of a plurality of different systems (hereinafter, referred to as 'secondary systems') which have no priority to use the TV band and intend to detect and use a predetermined frequency band in the TV band as an available frequency band. Here, the TVBDs 140 and 160 share the predetermined frequency band through coexistence and frequency sharing, in order to more efficiently use limited frequency resources. That is, the TVBDs 140 and 160 transmit and receive data through channels allocated from the TVWS.

As described above, the CEs 150 and 170 are independently positioned in the TVBDs 140 and 160, respectively, and transmit and receive information of the TVBDs 140 and 160 and information of the CMs 120 and 130. In the embodiment of the present invention, the following descriptions will be focused on a case which the CEs 150 and 170 independently exist in the TVBDs 140 and 160, for convenience of explanation. However, the CEs 150 and 170 may be included in the TVBDs 140 and 160 or the CMs 120 and 130.

The CEs 150 and 170 extract context information related to the TVBDs 140 and 160, which is requested by the CMs 120 and 130, from the TVBD 140 and 160, and transmit the extracted information to the CMs 120 and 130. The context information includes a wireless access method, transmit power, spectrum sensing threshold values, and locations of the TVBDs 140 and 160. That is, the CEs 150 and 170 acquire communication related information of the respective systems as the context information of the secondary systems and transmit the acquired information to the CMs 120 and 130.

The CEs 150 and 170 receive requests of the CMs 120 and 130 for managing the TVBDs 140 and 160, e.g., requests for the context information and configuration of the TVBDs 140 and 160. The CEs 150 and 170 update the context information of the TVBDs 140 and 160 according to the requests, and reset the configuration of the TVBDs 140 and 160, i.e., reconfigure the TVBDs 140 and 160. In other words, the CEs 150 and 170 receive changed information of the context information, i.e., event information of the TVBDs 140 and 160 as a request for the context information of the TVBDs 140 and 160, and update the context information of the TVBDs 140 and 160 according to the event information. In addition, the CEs 150 and 170 receive information related to the reconfiguration of the TVBDs 140 and 160 as a request for the configuration of the TVBDs 140 and 160, and reset the configuration of the TVBDs 140 and 160 according to the reconfiguration information, i.e., reconfigures the TVBDs 140 and 160 according to the reconfiguration information.

The CMs 120 and 130 determine operating frequency allocation, transmit power allocation, and transmit time allocation, in order to improve the frequency sharing efficiency between the TVBDs 140 and 160. That is, the CMs 120 and 130 perform the operating frequency allocation, the transmit power allocation, and the transmit time allocation for the TVBDs 140 and 160 in the available frequency band, in order to improve the frequency sharing efficiency between the TVBDs 140 and 160 with respect to the available frequency band in the above-described TV band.

In order to more efficiently improve the frequency sharing efficiency between the TVBDs 140 and 160, the CMs 120 and 130 perform the operating frequency allocation, the transmit power allocation, and the transmit time allocation for the corresponding TVBDs in the available frequency band by transmitting and receiving information to and from CMs of TVBDs which do not correspond thereto, e.g., neighbor CMs, for example, transmitting and receiving the context information and the event information of the TVBDs. At this time, the CMs 120 and 130 acquire the context and event information of the TVBDs which do not correspond thereto by directly transmitting and receiving the information to and from other CMs, e.g., neighbor CMs or by transmitting and receiving the information to and from other CMs through the CDIS 110. In addition, the CMs 120 and 130 acquire information on spectrum use in the primary system, i.e., channel information on available channels in the TV band through an external DB, e.g., the TVWS DB 180 or request other CMs to reconfigure the TVBDs corresponding thereto.

As described above, the CDIS 110 supports a control operation of the CMs 120 and 130 for frequency sharing of the TVBDs 140 and 160 with respect to the available frequency band in the TV band. That is, the CDIS 110 receives the context and event information of the TVBDs 140 and 160 from the CMs 120 and 130 and stores the received context and event information. According to requests of the CMs 120 and 130, the CDIS 110 transmits the context and event information of the TVBDs 140 and 160 to the CMs 120 and 130. In addition, the CDIS 110 acquires the information on the spectrum use in the primary system, that is, the channel information on the available channels in the TV band through an external DB, e.g., the TVWS DB 180, and stores the acquired information.

The TVWS DB 180 provides the channel information on the available channels in the TVWS, e.g., the shared channel information to the CMs 120 and 130. The channel information is provided only to TVBDs which are registered in the TVWS DB 180 and of which the identification numbers are authenticated.

The resource management system in the communication system in accordance with the embodiment of the present invention includes the TVWS DB 180, the CDIS 110, the CMs 120 and 130, and the CEs 140 and 170 such that the secondary systems share and use the available frequency band in the frequency band used by the primary system, such as the TV band, that is, the TVBDs 140 and 160 coexist and share the frequency band. Here, the TVBDs 140 and 160 may include a base station (hereinafter, referred to as a 'BS'), an access point (hereinafter, referred to as an 'AP'), a service access point (hereinafter, referred to as a 'SAP'), and a terminal as the devices of the secondary systems to share and use the available frequency band as described above. Furthermore, the secondary systems may include systems having different communication methods, e.g., systems based on IEEE 802.19, IEEE 802.22 and the like as the plurality of different systems to share the available frequency band as described above.

The resource management system in the communication system in accordance with the embodiment of the present invention classifies available channels in the TV band such that the TVBDs 140 and 160 coexist and share the available frequency band in the already-used frequency band, allocates the available channels such that the TVBDs 140 and 160 use the allocated available channels, and then selects operating channels in the TVWS. That is, in the resource management system for the coexistence and frequency sharing between the plurality of different systems, predetermined objects, e.g., the CMs 120 and 130 select the operating channels in the TVWS in order for effective coexistence. At this time, the resource management system classifies and allocates available channels in the TVWS so as to effectively select the operating channels in the TVWS.

Here, the number of systems intended to coexist through frequency sharing is larger than the number of channels available in a corresponding region when the plurality of systems coexist. Therefore, when selecting the operating channels of the plurality of systems for coexistence, e.g., TVBDs, the frequency management system selects/allocates the operating channels using individual TV channel allocation, shared TV channel allocation between same/similar TVBDs, and shared TV channel allocation between dissimilar TVBDs.

The individual TV channel allocation is where different TV channels are adaptively allocated to the respective TVBDs. Accordingly, since spectrum overlapping between the TVBDs does not occur, the individual TV channel allocation does not cause interference, and allocates proper TV channels to the TVBDs so as to support the coexistence of the TVBDs. The shared TV channel allocation between same/similar TVBDs is where two or more same/similar TVBDs, e.g., TVBDs using the same wireless access method share the same TV channels. At this time, two or more TV channels may be allocated to and shared by the same/similar TVBDs. Here, when the same/similar TVBDs share the TV channels, a self-coexistence algorithm is used to reduce interference occurring between the same/similar TVBDs. For example, the same/similar TVBDs, that is, two or more IEEE 802.22 systems as the same/similar systems perform channel sharing between IEEE 802.11 systems using the self-coexistence algorithm such as an on-demand frame contention (hereinafter, referred to as 'ODFC'). Furthermore, the shared TV channel allocation between dissimilar TVBDs is where two or more dissimilar TVBDs, that is, TVBDs using different wireless access methods share the same TV channels. In the shared TV channel allocation between dissimilar TVBDs, a coexistence algorithm between dissimilar systems is used to minimize interference occurring between dissimilar TVBDs.

Furthermore, the resource management system selects the operating channels which are to be used by the CM, in order for the coexistence and frequency sharing of a plurality of systems. That is, as described above, the resource management system classifies available channels in the TVWS, and then allocates channels from the classified available channels to select the operating channels. At this time, the resource management system classifies idle channels, i.e., available channels in the TV band using registered TVBD information, and allocates the operating channels to the plurality of systems from the classified channels. Then, the operation in which the CM of the resource management system in the communication system in accordance with the embodiment of the present invention allocates the available channels in the TV band will be described in more detail.

Figure 2:
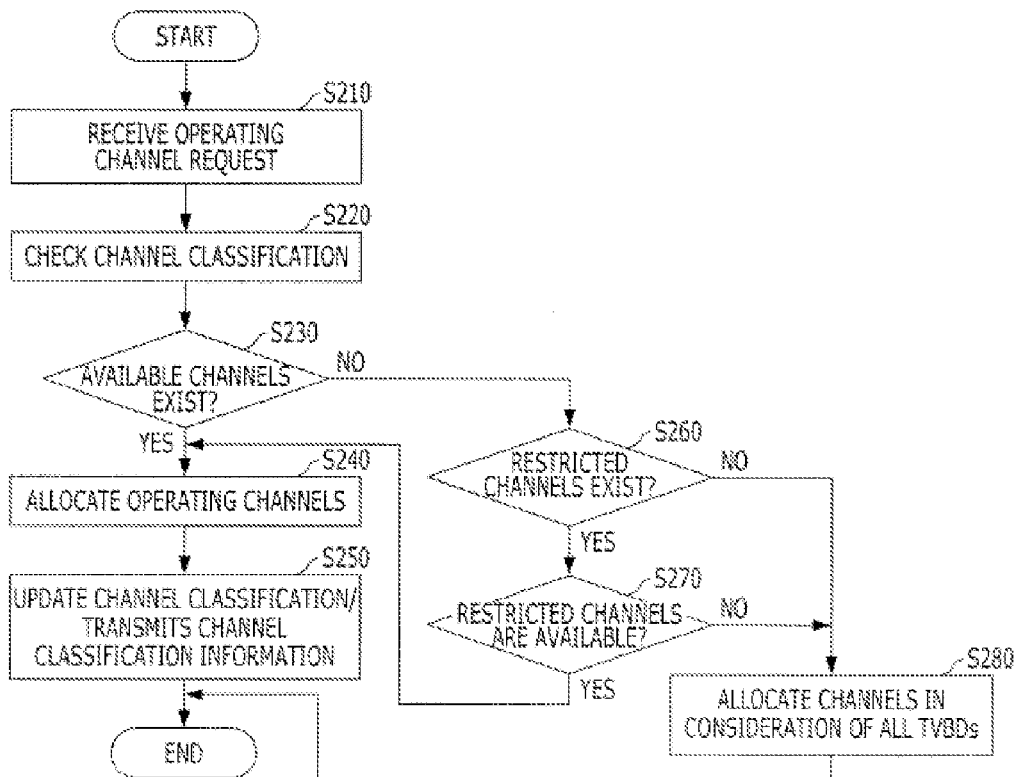
FIG. 2 is a flow chart showing a channel allocation operation of the resource management system in a communication system in accordance with the embodiment of the present invention.

FIG. 2 is a flow chart showing the channel allocation operation of the resource management system in the communication system in accordance with the embodiment of the present invention. FIG. 2 schematically shows the channel allocation operation of the CM, when TVBDs request channel allocation in the TVWS, or particularly, when the TVBDs request the CM to allocate new operating channels because various QoS requirements requested by users are not satisfied while services are provided to the users through the operating channels allocated by the CM of the resource management system. Furthermore, the resource management system allocates available channels as operating channels to the TVBDs according to the type of the TVBDs and whether or not neighbor CMs use the channels in the TVWS. Therefore, the resource management system performs the channel classification in the TVWS and then performs the operating channel allocation, in order for effective coexistence and frequency sharing between the plurality of systems.

Referring to FIG. 2, the CM of the resource management system receives an allocation request message for operating channels from the plurality of systems which intend to provide services to users through the coexistence and frequency sharing in the TVWS, i.e., the TVBDs, at step S210. Here, the CM receives messages requesting the allocation of new operating channels from TVBDs which do not satisfy QoS requirements requested by users, while providing services to the users using the operating channels allocated from the CM.

Then, at step S220, the CM checks the channel classification of the TVWS in the TV band. The TV band is classified into operating channels, coexistent channels, available channels, protected channels, restricted channels, disallowed channels, allowed channels, unclassified channels and so on. The CM checks the channel classification state for the TVWS in the TV band at the step S220. The channel classification for the TVWS in the TV band will be described in more detail with reference to FIG. 3. Thus, the detailed descriptions thereof are omitted herein.

At step S230, the CM checks whether or not available channels exist in the channel classification of the TV band. That is, the CM checks whether or not channels which may be used by the TVBDs exist in the TV band.

When it is checked as the result of the step S230 that the available channels exist in the TV band, the CM allocates operating channels to the TVBDs from the available channels of the TV band, at step S240. Then, the CM updates the channel classification in the TV band in response to the operating channel allocation for the TVBDs, and then transmits the updated channel classification information to the CDIS and neighbor CMs, at step S250.

Meanwhile, when it is checked as the result of the step S230 that available channels do not exist in the TV band, the CM checks whether or not restricted channels exist in the TV band, at step S260.

When it is checked as the result of the step S260 that the restricted channels exist in the TV band, the CM checks whether or not the existing restricted channels are available, at step S270. That is, the CM checks whether or not the TVBDs may use the restricted channels in the TV band through coexistence and frequency sharing. At this time, when the restricted channels in the TV band are available, the CM allocates operating channels to the TVBDs from the restricted channels in the TV band, at step S240. Then, the CM updates the channel classification of the TV band and transmits the updated channel classification information to the CDIS and neighbor CMs, at step S250.

Meanwhile, when it is checked as the result of the step S260 that the restricted channels do not exist in the TVWS or when it is checked as the result of the step S270 that the restricted channels are not available, the CM allocates operating channels to the TVBDs registered in the CM in the TVWS by considering TVBDs causing adjacent frequency interference with the TVBDs registered in the CM, i.e., TVBDs registered in neighbor CMs, at step S280. Here, the CM allocates available channels as the operating channels to the TVBDs according to the type of the TVBDs and whether or not the channels are used by the neighbor CMs in the TVWS. At this time, the CM sets an Initiate_Channel_Allocation flag to '1', for example, to allocate the available channels to the plurality of systems, i.e., the TVBDs. Hereinafter, the classification of available channels in the TV band in the communication system in accordance with the embodiment of the present invention will be described in more detail with reference to FIG. 3.

Figure 3:
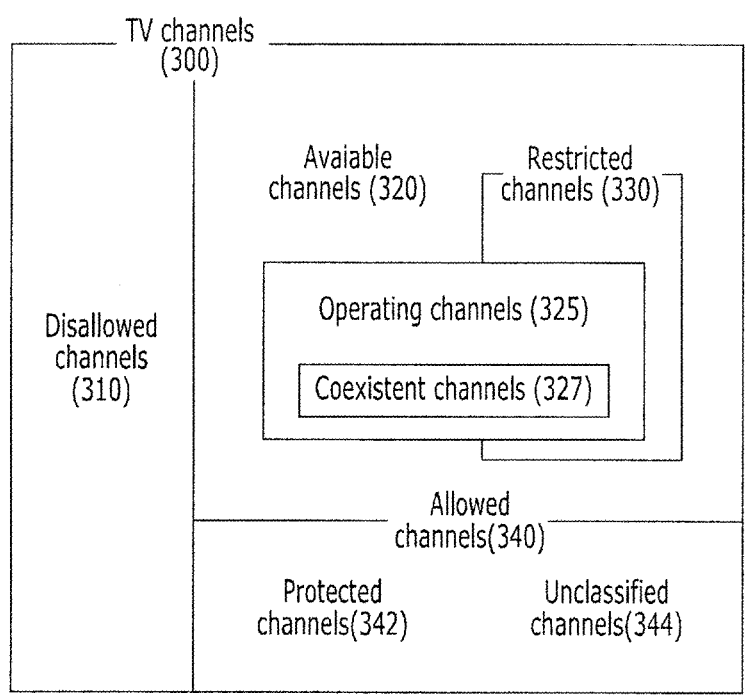
FIG. 3 is a diagram explaining channel classification of the resource management system in the communication system in accordance with the embodiment of the present invention.

FIG. 3 is a diagram explaining the channel classification of the resource management system in the communication system in accordance with the embodiment of the present invention. Here, since the channel allocation is decided according to the type of TVBDs and whether neighbor CMs use channels or not in the TVWS, the resource management system performs the channel classification of the TVWS for the TV band as shown in FIG. 3, in order for effective coexistence and frequency sharing between a plurality of systems.

Referring to FIG. 3, the CM of the resource management system acquires information on available channels in the TV band, that is, channel information of the TVWS from the TVWS DB, and classifies TV channels 300 of the TV band, which the plurality of systems do not have a right to use, into disallowed channels 310, available channels 320, restricted channels 330, allowed channels 340, operating channels 325, coexistent channels 327, protected channels 342, unclassified channels 344 and so on, based on the channel information. Here, the above-described channel classification of the CM in the TV channels is only an example, and the TV channels may be classified in various manners according to the coexistence and frequency sharing of the plurality of systems in the TVWS.

The operating channels 325 indicate a group of sub frequency resources allocated to one system, i.e., one TVBD which shares the TV channels 300 through coexistence and frequency sharing or a plurality of systems, i.e., TVBDs which uses the same wireless access method. Here, the sub frequency resources may be represented by channels as partial frequency bands in the entire frequency band which may be used by the primary incumbent, that is, the primary system. Furthermore, the operating channels 325 are allocated from the available channels 320 and the restricted channels 330 of the TV channels 300.

The coexistent channels 327 indicate a group of sub frequency resources allocated to two or more systems, i.e., two or more TVBDs which use the same wireless access method or different wireless access methods. The coexistent channels 327 are allocated from the operating channels 325 of the TV channels 300.

The available channels 320 indicate a group of sub frequency resources which may be allocated to one or more systems, i.e., one or more TVBDs from the TV channels through coexistence and frequency sharing, because they are not used locally or temporally by the primary incumbent system, i.e., the primary system, and satisfy the channel quality to a predefined level or more. That is, the available channels 320 indicate channels which may be used by a plurality of systems, i.e., TVBDs through the coexistence and frequency sharing, and are allocated from the TV channels 330.

The protected channels 342 indicate a group of sub frequency resources which are used by the primary incumbent system, i.e., the primary system and cannot be allocated to a plurality of systems, i.e., TVBDs. That is, the protected channels 342 indicate channels which cannot be used by the plurality of systems.

The restricted channels 330 indicate a group of sub frequency resources which may be restrictively allocated to a plurality of system from the TV channels 300 according to regulations related to the frequency band. For example, since adjacent sub frequency resources are used by the primary system, sub frequency resources which may be restrictively allocated to the plurality of systems through coexistence and frequency sharing are included in the restricted channels 300. Here, adjacent sub frequency resources of an F-th sub frequency resource are defined as an (F±1)-th sub frequency resource or an (F±2)-th sub frequency resource. At this time, the sub frequency resources included in the restricted channels 330 indicate frequency resources which are not allocated to a plurality of systems, i.e., TVBDs. Furthermore, the sub frequency resources of the restricted channels 330 are restrictively allocated to the plurality of systems, because the corresponding frequency band is allocated to the plurality of systems in a state where the sub frequency resources of the corresponding frequency band use a low power level which is positively discriminated from a power level used by the primary system.

The disallowed channels 310 indicate a group of sub frequency resources in the TV channels 300, which the plurality of systems are forbidden to use according to the regulation related to the frequency band, i.e., a group of sub frequency resources which must not be allocated to the plurality of systems.

The unclassified channels 344 indicate a group of sub frequency resources which do not correspond to the channel classification of the TV channels 300 into the operating channels 325, the coexistent channels 327, the available channels 320, the restricted channels 330, the protected channels 342, and the disallowed channels 310. That is, the unclassified channels 344 indicate a group of sub frequency resources of which the states are not identified, in the TV channels 300.

The CM of the resource management system in accordance with the embodiment of the present invention transmits and receives messages between the TVBDs and the TVWS DB, the CDIS, the neighbor CMs, and the CEs registered in the CM, in order to classify the TV channels 300. First, the CM acquires idle channel information, i.e., the channel information of the TVWS from the CEs registered in the TVWS DB or the CM, in order to perform the channel classification for the TVWS in the above-described TV band. The CM transmits an AvailableChannel_Request message or CM_AvailableChannel_Request message as a request message of the channel information for acquiring such channel information to the CEs registered in the TVWS DB or the CM.

Table 1 shows the header and the payload of the AvailableChannel_Request message to request the channel information of the TVWS. Furthermore, Table 2 shows the header and the payload of the CM_AvailableChannel_Request message to request the channel information of the TVWS, and Table 3 shows the data type of the CM_AvailableChannel_Request message.

TABLE 1

| Information element | Data type | Description |
|---|---|---|
| Header | | |
| sourceIdentifier = CM_ID | CX_ID | Source identifier |
| destinationIdentifier = CE_ID | CX_ID | Destination identifier |

TABLE 1-continued

| Information element | Data type | Description |
|---|---|---|
| ACKPolicy | BOOLEAN | Request to send acknowledgement of reception |
| Payload | | |
| None | | |

TABLE 2

| Information element | Data type | Description |
|---|---|---|
| Header | | |
| sourceIdentifier = CM_ID | CX_ID | Source identifier |
| destinationIdentifier = TVWSDB_ID | CX_ID | Destination identifier |
| ACKPolicy | BOOLEAN | Request to send acknowledgement of reception |
| Payload | | |
| requestedTimeStamp | TIME | Time of request |
| deviceFCCID | | FCC ID of TVBD network or device |
| deviceSN | | Serial number of TVBD network or device |
| deviceLocation | DeviceLocation | Location of TVBD network or device |
| antennaHeight | REAL | Antenna height of TVBD network or device |
| networkType | NetworkType | E.g.. fixed mode 2 |
| ... | | |

TABLE 3

```
CX_ID ::= ENUMERATED{
    CE_ID
    CM_ID
    CDID_ID
    TVWSDB_ID
}
DeviceLocation ::= SEQUENCE{
    coordinateX    REAL,
    coordinateY    REAL,
    coordinateZ    REAL
}
NetworkType ::= ENUMERATED{
    fixed,
    mode2,
    ...
}
```

Furthermore, as the CM transmits the AvailableChannel_Request message or the CM_AvailableChannel_Request message to the CMs registered in the TVWS DB or the CM in order to acquire the channel information of the TVWS, the CM receives an AvailabeChannel_Response message or AvailableChannel_Announcement message including the channel information of the TVWS as a response message to the AvailableChannel_Request message or the CM_AvailableChannel_Request message from the CEs registered in the TVWS DB or the CM.

Table 4 shows the header and the payload of the AvailableChannel_Response message including the channel information of the TVWS, and Table 5 shows the data type of the AvailableChannel_Response message. Furthermore, Table shows the header and the payload of the AvailableChannel_Announcement message including the channel information of the TVWS.

TABLE 4

| Information element | Data type | Description |
|---|---|---|
| Header | | |
| sourceIdentifier = CE_ID or TVWSD_ID | CX_ID | Source identifier |
| destinationIdentifier = CM_ID | CX_ID | Destination identifier |
| ACKPolicy | BOOLEAN | Request to send acknowledgement of reception |
| Payload | | |
| listOfAllowedTVWSChNumber | ListOfAllowedTVWSChNumber OPTIONAL | Allowed TVWS channel number list |
| constOfChUses | ConstOfChUses OPTIONAL | Channel user constraint |
| Note: Information elements below are repeated for each available frequency | | |
| startFreq | REAL OPTIONAL | Start frequency |
| stopFreq | REAL OPTIONAL | Stop frequency |
| txPowerLimit | REAL OPTIONAL | Transmit power limit |
| AggregatedInterferenceControlParameters | AggregatedInterferenceControlParameters | Aggregated Interference Control Parameters |

TABLE 5

```
ListOfAllowedTVWSChNumber :: = SEQUENCE OF INTEGER
ConstOfChUseID ::= ENUMERATED{
    regulationMaxTxPower,
    regulationMaxAntGain,
    regulationMaxAntHeight,
    regulationTVDBUpdateTime,
    OutOfBandEmissionLimit,
    ...
}
ConstOfChUseValue :: = CHOICE{
    regulationMaxTxPower           REAL,
    regulationMaxAntMaxGain,       REAL,
    regulationMaxAntHeight,        REAL,
    regulationTVDBUpdateTime,      REAL,
    OutOfBandEmissionLimit         REAL,
    ...
}
ConstOfChUse :: = SEQUENCE{
    constOfChUseID       ConstOfChUseID,
```

TABLE 5-continued

```
    constOfChUseValue    ConstOfChUseValue
}
ConstOfChUse :: = SEQUENCE OF ConstOfChUse
AggregatedInterferenceControlParameters :: = SEQUENCE{
    ReferencePointID               INTEGER,
    Geolocation                    ReferencePointGeolocation,
    ACS                            REAL,
    Antenna height                 REAL,
    Antenna gain                   REAL,
    Protection ratio               REAL,
    ...
}
ReferencePointGeolocation :: = ENUMERATED {
    Latitude                       REAL,
    Longitude                      REAL,
    Altitude                       REAL,
    ...
}
```

TABLE 6

| Information element | Data type | Description |
|---|---|---|
| Header | | |
| sourceIdentifier = CE_ID or TVWSDB_ID | CX_ID | Source identifier |
| destinationIdentifier = CM_ID | CX_ID | Destination identifier |
| ACKPolicy | BOOLEAN | Request to send acknowledgement of reception |
| Payload | | |
| listOfAllowedTVWSChNumber | ListOfAllowedTVWSChNumber OPTIONAL | Allowed TVWS channel number list |
| constOfChUses | ConstOfChUses OPTIONAL | Channel user constraint |
| Note: Information elements below are repeated for each available piece of frequency | | |
| networkID | NetworkID OPTIONAL | E.g.. BSSID |
| startFreq | REAL OPTIONAL | Start frequency |
| startFreq | REAL OPTIONAL | Stop frequency |

TABLE 6-continued

| Information element | Data type | Description |
|---|---|---|
| txPowerLimit | REAL OPTIONAL | Transmit power limit |
| AggregatedInterferenceControlParameters | AggregatedInterferenceControlParameters | Aggregated Interference Control Parameters |

As such, the CM of the resource management system acquires the channel information of the TVWS by transmitting and receiving the AvailableChannel_Request message or CM_AvailableChannel_Request message to request the channel information of the TVWS and the AvailableChannel_Response message or the AvailableChannel_Announcement message including the channel information of the TVWS, and performs the channel classification for the TVWS in the TV band as shown in FIG. 3 based on the acquired channel information of the TVWS, that is, classifies the channels of the TV band. Furthermore, the CM allocates the classified channels available in the TV band to the plurality of systems, i.e., the TVBDs as the operating channels of the TVBDs through the coexistence and frequency sharing.

TABLE 7

| Information element | Data type | Description |
|---|---|---|
| Header | | |
| sourceIdentifier = CE_ID or CM_ID | CX_ID | Source identifier |
| destinationIdentifier = CM_ID | CX_ID | Destination identifier |
| ACKPolicy | BOOLEAN | Request to send acknowledgement of reception |
| Payload | | |
| eventParams | Eventparams | List of event parameters |

TABLE 8

```
EventDescr :: = ENUMERATED{
    SINRThresholdReached,
    QoSDegradation,
    MisLocatedTVBDDetected,
    ...
}
MisLocatedTVBDDetectedInfo :: = SEQUENCE{
    networkID         NetworkID,
        listOfoperatingFrequency        SEQUENCE OF SEQUENCE{startFeq REAL,
stopFreq REAL}
OPTIONAL,
        listOfChannelNumber      SEQUENCE OF INTEGER OPTIONAL
}
AddInfo :: = CHOICE{
    misLocatedTVBDDetectedInfo  MisLocatedTVBDDetectedInfo,
    ...
}
EventParams :: = SEQUENCE{
    eventDescr       EventDescr,
    addInfo          AddInfo OPTIONAL
}
```

That is, the CM of the resource management system performs the channel classification of the TV band, and then allocates the channels available in the TV band as the operating channels to the plurality of systems, i.e., the TVBDs. The TVBDs provide communication services to users at the operating channels allocated through the coexistence and frequency sharing. At this time, when the TVBDs cannot provide communication services satisfying QoS requirements requested by the users, the TVBDs transmit an allocation request message requesting allocation of new operating channels to the CM.

At this time, the TVBDs transmit an Event_Indication message or Event_Confirm message to the CM as an event message announcing that an event occurs to allocate new operating channels for satisfying the QoS requirements requested by the users. That is, the TVBDs transmit the Event_Indication message or Event_Confirm message to the CM, and request the CM to allocate new operating channels in the TVWS. Table 7 shows the header and the payload of the Event_Indication message, Table 8 shows the data type of the Event_Indication message, and Table 9 shows the header and the payload of the Event_Confirm message.

TABLE 9

| Information element | Data type | Description |
|---|---|---|
| Header | | |
| sourceIdentifier = CM_ID | CX_ID | Source identifier |
| destinationIdentifier = CE_ID or CM_ID | CX_ID | Destination identifier |
| ACKPolicy | BOOLEAN | Request to send acknowledgement of reception |
| Payload | | |
| None | | |

As such, the CM receives the Event_Indication message or the Event_Confirm message from the TVBDs as the allocation request message to request the allocation of new operating channels. Then, as described with reference to FIG. 2, the CM allocates the operating channels to the TVBDs from the channels available in the TV band, i.e., the available channels or restricted channels of the TVWS. Furthermore, as described with reference to FIG. 2, the CM updates the channel classification of the TV band to reflect the operating channel allocation for the TVBDs into the channel classification described with reference to FIG. 3, in response to the allocation of the operating channels to the TVBDs from the TVWS. Then, the CM transmits the updated channel classification information to the CDIS and neighbor CMs.

That is, the CM transmits the updated channel classification information to the CDIS and the neighbor CMs, after allocating the operating channels to the TVBDs from the TVWS. At this time, the CM transmits a ChannelClassification_Announcement message, a NeighborInformation_Announcement message, or a NeighborInformation_Confirm message as a message including the channel classification information to the CDIS and the neighbor CMs. For example, the CM transmits the ChannelClassification_Announcement message including the channel classification information to the CDIS, and transmits the NeighborInformation_Announcement message or the NeighborInformation_Confirm message including the channel classification information to the neighbor CMs.

Table 10 shows the header and the payload of the ChannelClassification_Announcement message including the channel classification information, and Table 11 shows the data type of the ChannelClassification_Announcement message. Furthermore, Table 12 shows the header and the payload of the NeighborInformation_Announcement message including the channel classification information, and Table 13 shows the data type of the NeighborInformation_Announcement message. Furthermore, Table 14 shows the header and the payload of the NeighborInformation_Confirm message including the channel classification information.

TABLE 10

| Information element | Data type | Description |
|---|---|---|
| Header | | |
| sourceIdentifier = CM_ID | CX_ID | Source identifier |
| destinationIdentifier = CM_ID or CE_ID | CX_ID | Destination identifier |
| ACKPolicy | BOOLEAN | Request to send acknowledgement of reception |
| Payload | | |
| Note: Information elements below are repeated for each TVBD network or device | | |
| networkID | NetworkID | Network ID |
| chClassInfo | ChClassInfo | Channel classification information of CE |

TABLE 11

```
NetworkID :: = ENUMERATED{
    BSSID,
    ...
}
OperatingChannelInfo :: = SEQUENCE {
            operatingChannelNumber        INTEGER,
    listOfNetworkID                       SEQUENCE OF NetworkID,
    ...
}
ChClassInfo :: = SEQUENCE {
    availableChannelList          SEQUENCE OF INTEGER,
    restrictedChannelList          SEQUENCE OF INTEGER,
    protectedChannelList          SEQUENCE OF INTEGER,
    unclassifiedChannelList           SEQUENCE OF INTEGER,
    operatingChannelList          SEQUENCE OF OperatingChannelInfo,
    coexistenceChannelList            SEQUENCE OF OperatingChannelInfo,
    ...
}
```

TABLE 12

| Information element | Data type | Description |
|---|---|---|
| Header | | |
| sourceIdentifier = CM_ID | CX_ID | Source identifier |
| destinationIdentifier = CM_ID | CX_ID | Destination identifier |
| ACKPolicy | BOOLEAN | Request to send acknowledgement of reception |
| Payload | | |
| sourceTVBDIdentifier | CX_ID | CE_ID of TVBD network or device served by source CM |

TABLE 12-continued

| Information element | Data type | Description |
|---|---|---|
| sourceNetworkTechnology | NetworkTechnology | E.g., 802.11af, 802.22 |
| networkType | NetworkType | TVBD network or device type |
| sourceListOfSupportedChannelNumber | ListOfSupportedChannelNumber OPTIONAL | List of supported channel number |
| sourceListOfOperatingChannelNumber | ListOfOperatingChannelNumber OPTIONAL | List of operating channel number |
| sourceListOfSupportedFrequencies | ListOfSupportedFrequencies OPTIONAL | List of supported channel number |
| sourceListOfOperatingFrequencies | ListOfSupportingFrequencies OPTIONAL | List of operating frequencies |
| SourceNetworkCapabilities | NetworkCapabilities | Device and network capabilities that have effect on coexistence decision making |
| sourceSubscribedService | SubscribedService | Coexistence service subscription |
| managingCM | BOOLEAN | Indicates whether this TVBD network or device shall be managed by source CM or destination CM |
| chClassInfo | ChClassInfo OPTIONAL | Channel classification information |
| scheduledTimeEnd | BOOLEAN OPTIONAL | Indicates whether this TVBD network or device finished scheduled time when channel is shared |

TABLE 13

```
SubscribedService :: = ENUMERATED{
    information,
    management,
    interCMNeighbors,
    allNeighbors
}
SubscribedService :: = ENUMERATED{
    information,
    management,
    interCMNeighbors,
    allNeighbors
}
```

TABLE 14

| Information element | Data type | Description |
|---|---|---|
| Header | | |
| sourceIdentifier = CM_ID | CX_ID | Source identifier |
| destinationIdentifier = CM_ID | CX_ID | Destination identifier |
| ACKPolicy | BOOLEAN | Request to send acknowledgement of reception |
| Payload | | |
| None | | |

As such, the resource management system in accordance with the embodiment of the present invention classifies the channels of the TVWS in the TV band, in order to allocate the channels to the TVBDs registered in the CM. The resource management system allocates the operating channels of the TVBDs from the channels available among the classified channels in the TV band, i.e., the available channels or restricted channels. Furthermore, when the TVBDs do not provide communication services satisfying the QoS requirements requested by the users while providing the communication services to the users at the allocated operating channels through the coexistence and frequency sharing, the TVBD may request new operating channels. In this case, the CM checks the classified channels in the TV band, and allocates new operating channels to the TVBDs from the available channels or restricted channels.

At this time, the CM of the resource management system classifies the channels of the TV band, and adaptively allocates the operating channels to the TVBDs registered in the CM according to the number of available channels in the TV band, i.e., the channel number of the TVWS and whether or not the neighbor CMs use the TVWS. Accordingly, as the operating channels are effectively allocated, the plurality of systems effectively perform the coexistence and frequency sharing in the TVWS. In particular, the CM of the resource management system classifies the channels according to the channel characteristics and allocates the channels available in the TV band as the operating channels. Therefore, the CM may adaptively allocate the operating channels according to the system environments of the plurality of systems. Furthermore, the CM of the resource management system effectively allocates the channels available in the TV band as the operating channels according to the number of channels available in the TVWS and the number of neighbor systems, i.e., neighbor CMs, in order to adaptively allocate the operating channels according to the system environments of the plurality of systems.

In accordance with the embodiments of the present invention, the resource management system and method manages frequency resources such that a plurality of systems use a frequency band available in an already-used frequency band such as a TV band through coexistence in a communication system. Therefore, limited frequency resources may be more effectively used to improve the usage efficiency of the frequency resources.

While the present invention has been described with respect to the specific embodiments, it will be apparent to those skilled in the art that various changes and modifications may be made without departing from the spirit and scope of the invention as defined in the following claims.

What is claimed is:

1. A resource management system in a communication system including a plurality of systems having no right to use a first frequency band, the resource management system comprising:
    a coexistence manager (CM) configured to manage the plurality of systems for the purpose of coexistence and frequency sharing of the plurality of systems in a frequency band available for the plurality of systems, when the available frequency band is detected in the first frequency band;
    a coexistence enabler (CE) configured to transmit and receive information of the plurality of systems and information of the CM; and
    a coexistence discovery and information server (CDIS) configured to support the CM to control the plurality of systems,
    wherein the CM performs channel classification for the first frequency band based on channel information of the available frequency band, and allocates operating channels to the plurality of systems,
    wherein the CM allocates the operating channels of the plurality of systems from available channels and restricted channels in the channel classification of the first frequency band,
    wherein the plurality of systems provide a service of required quality of service (QoS) with the allocated operating channels,
    wherein the plurality of systems comprise a plurality of base stations, a plurality of access points, a plurality of service access points, a plurality of terminals,
    wherein the CM updates the channel classification of the first frequency band in response to the operating channel allocation for the plurality of systems, and transmits the updated channel classification information to the CDIS and neighbor CMs.

2. The resource management system of claim 1, further comprising a TV white space database (TV WSDB) configured to provide channel information of the available frequency band,
    wherein the CM transmits a request message to the TVWS DB and the CE so as to acquire the channel information of the available frequency band.

3. The resource management system of claim 2, wherein the CM receives a response message including the channel information of the available frequency band from the TVWS DB and the CE in response to the request message.

4. The resource management system of claim 3, wherein the request message and the response message comprise a header, a payload, and a data type.

5. The resource management system of claim 1, wherein when the plurality of systems do not provide the service requested by users with the allocated operating channels while providing the service to the users with the allocated operating channels through the coexistence and frequency sharing, the plurality of systems transmit an event message requesting allocation of new operating channels to the CM.

6. The resource management system of claim 5, wherein the event message comprises a header, a payload, and a data type.

7. The resource management system of claim 5, wherein the CM receives the event message to check the channel classification of the first frequency band, and allocates the new operating channels from the available channels and the restricted channels in the channel classification of the first frequency band.

8. The resource management system of claim 1, wherein the CM classifies the first frequency band into operating channels, coexistent channels, available channels, protected channels, restricted channels, disallowed channels, allowed channels, and unclassified channels through the channel classification.

9. The resource management system of claim 1, wherein, when there are not the available channels and the restricted channels, the CM sets Initiate_Channel_Allocation flag.

10. The resource management system of claim 1, wherein the CM comprises the channel classification information, and transmits a message containing a header, a payload, and a data type to the CDIS and the neighbor CMs.

11. The resource management system of claim 1, wherein the CM allocates the operating channels of the plurality of systems from the available frequency band through individual TV channel allocation.

12. The resource management system of claim 1, wherein the CM allocates the operating channels of the plurality of systems from the available frequency band through shared TV channel allocation between similar and dissimilar devices.

13. A method for managing resources of a first frequency band in a communication system including a plurality of systems having no right to use the first frequency band, the method comprising:
    acquiring channel information of a frequency band available for the plurality of systems from a TV white space database (TV WSDB) providing channel information of the available frequency band, when the available frequency band is detected in the first frequency band;
    performing channel classification for the first frequency band based on the channel information of the available frequency band;
    allocating operating channels of the plurality of systems from the channel classification for the first frequency band; and
    updating the channel classification for the first frequency band in response to the operating channel allocation for the plurality of systems, and transmitting the updated channel classification information,
    wherein the operating channels of the plurality of systems are allocated from available channels and restricted channels in the channel classification of the first frequency band,
    wherein the plurality of systems provide a service of required quality of service (QoS) with the allocated operating channels,
    wherein the plurality of systems comprise a plurality of base stations, a plurality of access points, a plurality of service access points, a plurality of terminals.

14. The method of claim 13, further comprising receiving a message requesting allocation of new operating channels from the plurality of systems, when the plurality of systems do not provide the service requested by users with the allocated operating channels while providing the service to the users with the allocated operating channels through coexistence and frequency sharing.

15. The method of claim 14, wherein the channel classification for the first frequency band is checked in response to the allocation request of the new operating channels, and the new operating channel of the plurality of systems are allocated from the available channels and the restricted channels in the channel classification of the first frequency band.

16. The method of claim 13, wherein, in said performing the channel classification for the first frequency band based on the channel information of the available frequency band,
   the first frequency band is classified into operating channels, coexistent channels, available channels, protected channels, restricted channels, disallowed channels, allowed channels, and unclassified channels.

17. The method of claim 13, wherein, in said allocating the operating channels of the plurality of systems from the channel classification for the first frequency band,
   when there are not the available channels and the restricted channels, Initiate_Channel_Allocation flag is set.

18. The method of claim 13, wherein, in said allocating the operating channels of the plurality of systems from the channel classification for the first frequency band,
   the operating channels of the plurality of channels are allocated through one method of individual TV channel allocation and shared TV channel allocation between similar and dissimilar devices.

* * * * *